United States Patent
Kim et al.

(10) Patent No.: US 10,431,148 B2
(45) Date of Patent: Oct. 1, 2019

(54) MODULE TYPE DISPLAY APPARATUS, DISPLAY APPARATUS COMPRISING THE MODULE TYPE DISPLAY APPARATUS, AND CONTROL METHOD THEREOF

(71) Applicant: SAMSUNG ELECTRONICS CO., LTD., Suwon-si (KR)

(72) Inventors: Byung-chul Kim, Suwon-si (KR); Kil-soo Jung, Osan-si (KR); Woo-sung Shim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 258 days.

(21) Appl. No.: 15/366,202

(22) Filed: Dec. 1, 2016

(65) Prior Publication Data

US 2017/0352310 A1 Dec. 7, 2017

(30) Foreign Application Priority Data

Jun. 3, 2016 (KR) .................. 10-2016-0069620

(51) Int. Cl.
| | |
|---|---|
| *G09G 3/32* | (2016.01) |
| *G06F 3/14* | (2006.01) |
| *G09G 3/20* | (2006.01) |

(52) U.S. Cl.
CPC ............ *G09G 3/32* (2013.01); *G06F 3/1446* (2013.01); *G09G 3/2003* (2013.01);
(Continued)

(58) Field of Classification Search
CPC .. G09G 3/32; G09G 3/2003; G09G 2300/026; G09G 2320/0233;
(Continued)

(56) References Cited

U.S. PATENT DOCUMENTS

| | | | |
|---|---|---|---|
| 8,531,474 B2 | 9/2013 | Chang et al. | |
| 9,059,337 B1* | 6/2015 | Robinson | ............ H01L 33/0004 |

(Continued)

FOREIGN PATENT DOCUMENTS

| | | |
|---|---|---|
| JP | 2010-26215 A | 2/2010 |
| JP | 2010-103727 A | 5/2010 |

(Continued)

OTHER PUBLICATIONS

Communication dated May 23, 2017 by the International Searching Authority in counterpart International Patent Application No. PCT/KR2017/001613 (PCT/ISA/210 and PCT/ISA/237).

*Primary Examiner* — Mark Edwards
(74) *Attorney, Agent, or Firm* — Sughrue Mion, PLLC

(57) ABSTRACT

A module type display apparatus includes a communication interface configured to communicate with at least one external module type display apparatus; a display panel including a plurality of light emitting diodes (LEDs); a storage configured to store information regarding at least one of brightness and a color coordinate that is previously measured according to a characteristic of an LED among the plurality of light emitting diodes; at least one sensor configured to sense a characteristic of at least one LED; and a processor configured to set a target value based on at least one of second brightness and a second color coordinate received from the at least one external module type display apparatus, and control to adjust at least one of first brightness and first color coordinate of the at least one LED to have the target value, based on the information acquired from the storage.

18 Claims, 12 Drawing Sheets

(52) U.S. Cl.
CPC . *G09G 2300/026* (2013.01); *G09G 2320/029* (2013.01); *G09G 2320/0233* (2013.01); *G09G 2320/0285* (2013.01); *G09G 2320/041* (2013.01); *G09G 2320/048* (2013.01); *G09G 2320/0626* (2013.01); *G09G 2330/12* (2013.01); *G09G 2360/145* (2013.01)

(58) Field of Classification Search
CPC ..... G09G 2320/0285; G09G 2320/029; G09G 2320/041; G09G 2320/048; G09G 2320/0626; G09G 2320/12; G09G 2360/145; G06F 3/1446
See application file for complete search history.

(56) References Cited

U.S. PATENT DOCUMENTS

| | | |
|---|---|---|
| 2006/0114172 A1 | 6/2006 | Shivji |
| 2007/0236431 A1 | 10/2007 | Tada et al. |
| 2008/0122832 A1* | 5/2008 | Chen ............... G09G 3/32 345/214 |
| 2012/0200800 A1 | 8/2012 | Kurita |
| 2015/0002564 A1* | 1/2015 | Sugimoto ........... G09G 3/2014 345/698 |
| 2015/0319819 A1* | 11/2015 | Kikkawa ........... H05B 33/0851 315/151 |
| 2015/0339967 A1 | 11/2015 | Shin |

FOREIGN PATENT DOCUMENTS

| | | |
|---|---|---|
| JP | 2011-257540 A | 12/2011 |
| KR | 10-2008-0055585 A | 6/2008 |
| KR | 10-2015-0134167 A | 12/2015 |

\* cited by examiner

FIG. 7A

| | |
|---|---|
| 100 — MAX: 1200NIT<br>TARGET: 900NIT<br>GAIN=0.75 | MAX: 1200NIT<br>TARGET: 800NIT — 200<br>GAIN=0.67 |
| 300 — MAX: 1000NIT<br>TARGET: 700NIT<br>GAIN=0.7 | MAX: 1000NIT<br>TARGET: 800NIT — 400<br>GAIN=0.8 |

FIG. 7B

| | |
|---|---|
| 100 — MAX: 1200NIT<br>TARGET: 700NIT<br>GAIN=0.58 | MAX: 1200NIT<br>TARGET: 700NIT — 200<br>GAIN=0.58 |
| 300 — MAX: 1000NIT<br>TARGET: 700NIT<br>GAIN=0.7 | MAX: 1000NIT<br>TARGET: 700NIT — 400<br>GAIN=0.7 |

MODULE TYPE DISPLAY APPARATUS, DISPLAY APPARATUS COMPRISING THE MODULE TYPE DISPLAY APPARATUS, AND CONTROL METHOD THEREOF

CROSS-REFERENCE TO RELATED APPLICATION

This application claims priority from Korean Patent Application No. 10-2016-0069620, filed on Jun. 3, 2016, in the Korean Intellectual Property Office, the disclosure of which is incorporated herein in its entirety by reference.

BACKGROUND

1. Field

Apparatuses and methods consistent with exemplary embodiments relate to a module type display apparatus, a display apparatus comprising the module type display apparatus and a control method thereof, and more specifically, to a module type display apparatus configured to automatically compensate (or adjust) brightness and/or color coordinates thereof, a display apparatus comprising the module type display apparatus, and a control method thereof.

2. Description of the Related Art

A light emitting diode (LED) is a semiconductor light emitting device which converts electrical current into light. The brightness of the light emitting diode has steadily increased to the extent that the utilization of the light emitting diode is expanded into various light sources such as a display light source, an automobile light source and a lighting light source. Further, a light emitting diode that emits white light with an excellent efficiency can be realized, by using a fluorescent material or combining various colors of the light emitting diodes.

The light emitting diode can be mass-produced in a form of the light emitting device package. Among the mass-produced light emitting diode packages, light emitting diode packages that pass performance and characteristic inspection are gathered, classified according to a characteristic such as luminosity of each light emitting diode package, and used as light sources.

However, due to a frequently-used section (e.g., section corresponding to cinema contents having a different aspect ratio, a logo area, etc.) of a display including a plurality of LED modules (or LED cabinets), a difference of the brightness and/or color may occur according to LED chip degradation. Under the above circumstance, when the purpose of using a display is changed or different contents (e.g., contents having a different aspect ratio) is played back, a problem may occur in which non-uniform screen quality is provided per LED module.

SUMMARY

One or more exemplary embodiments overcome the above disadvantages and other disadvantages not described above. Also, the present inventive concept is not required to overcome the disadvantages described above, and an exemplary embodiment of the present inventive concept may not overcome any of the problems described above.

One or more exemplary embodiments provide a module type display apparatus configured to, when using a display, compensate (or adjust) the brightness and/or color coordinates between modules automatically and uniformly based on previously stored information without a need to measure the brightness and/or color coordinates, a display apparatus and a control method thereof.

According to an aspect of an exemplary embodiment, there is provided a module type display apparatus, including: a communication interface configured to communicate with at least one external module type display apparatus; a display panel including a plurality of light emitting diodes (LEDs); a storage configured to store information regarding at least one of brightness and a color coordinate that is previously measured according to a characteristic of an LED among the plurality of light emitting diodes; at least one sensor configured to sense a characteristic of at least one LED; and a processor configured to set a target value based on at least one of second brightness and a second color coordinate received from the at least one external module type display apparatus, and control to adjust at least one of first brightness and first color coordinate of the at least one LED to have the target value, based on the information acquired from the storage.

The processor may acquire, from the storage, the at least one of the first brightness and the first color coordinate of the at least one LED based on the sensed characteristic, compare the at least one of the first brightness and the first color coordinate with the at least one of the second brightness and the second color coordinate received from the at least one external module type display apparatus, and set the target value based on the at least one of the second brightness and the second color coordinate in response to the second brightness being lower than the first brightness and/or the second color coordinate being lower than the first color coordinate.

The information stored in the storage may include the information regarding the at least one of the brightness and the color coordinate that is previously measured according to at least one of a temperature characteristic and a service life characteristic of the LED.

The storage may store information regarding a correction coefficient, per pixel, to be used to adjust the at least one of the first brightness and the first color coordinate according to the at least one of the temperature characteristic and the service life characteristic of the LED, and the processor may acquire, from the storage, the correction coefficient, per pixel, and adjust the at least one of the first brightness and the first color coordinate of the at least one LED to have the target value, based on the acquired correction coefficient.

The processor may obtain a correction coefficient by comparing the at least one of the first brightness and the first color coordinate of the at least one LED with the target value, and adjust the at least one of the first brightness and the first color coordinate of the at least one LED to have the target value, based on the obtained correction coefficient.

The sensor may include at least one of a temperature sensor and an electrical current detecting sensor, and the processor may acquire, from the storage, the at least one of the first brightness and the first color coordinate of the at least one LED corresponding to at least one of a temperature characteristic and a service life characteristic sensed by the at least one of the temperature sensor and the electrical current detecting sensor.

The module type display apparatus may include at least one of an LED module, the LED module including at least one LED device, and an LED cabinet in which a plurality of LED modules are connected to each other.

According to an aspect of another exemplary embodiment, there is provided a display apparatus, including: a display including a plurality of display modules; a storage configured to store information regarding at least one of brightness and a color coordinate that is previously measured according to a characteristic of a light emitting diode (LED) included in a display module among the plurality of display modules; a plurality of sensors configured to respectively sense characteristics of the plurality of display modules; and a processor configured to determine a certain display module, among the plurality of display modules, based on the sensed characteristics, configured to set at least one of first brightness and a first color coordinate corresponding to the certain display module as a target value, and configured to adjust at least one of second brightness and a second color coordinate of at least one display module, excluding the certain display module, to have the target value, based on the information acquired from the storage.

The processor may acquire, from the storage, the at least one of the second brightness and the second color coordinate of the at least one display module based on the sensed characteristics, and set the target value based on the at least one of the first brightness and the first color coordinate corresponding to the certain display module, in response to the first brightness being lower than the second brightness and/or the first color coordinate being lower than the second color coordinate.

The processor may exclude a display module of which the at least one of the first brightness value and the color coordinate value is equal to or less than a preset threshold value, and determine the certain display module among remaining display modules of the plurality of display modules.

The information stored in the storage may include the information regarding the brightness and the color coordinate that is previously measured according to at least one of a temperature characteristic and a service life characteristic of the LED.

The storage may store information regarding a correction coefficient, per pixel, to be used to adjust the at least one of the second brightness and the second color coordinate according to the at least one of the temperature characteristic and the service life characteristic of the LED, and the processor may acquire, from the storage, the correction coefficient, per pixel, and adjust the at least one of the second brightness and the second color coordinate of the at least one display module, excluding the certain display module, to have the target value, based on the acquired correction coefficient.

The processor may obtain a correction coefficient by comparing the at least one of the first brightness and the first color coordinate of the certain display module with the at least one of the second brightness and the second color coordinate of the at least one display module, excluding the certain display module, and adjust the at least one of the second brightness and the second color coordinate to have the target value, based on the correction coefficient.

The plurality of sensors may include at least one of a temperature sensor and an electrical current detecting sensor, and the processor may acquire, from the storage, the at least one of the second brightness and the second color coordinate of the at least one display module, excluding the certain display module, corresponding to at least one of a temperature characteristic and a service life characteristic sensed by the at least one of the temperature sensor and the electrical current detecting sensor.

One of a plurality of display modules may include an LED module, including at least one LED device, and an LED cabinet in which a plurality of LED modules are connected to each other.

According to an aspect of still another exemplary embodiment, there is provided a control method of a module type display apparatus, the module type display apparatus including a storage configured to store information regarding at least one of brightness and a color coordinate according to a characteristic of a light emitting diode (LED) included in a display panel, the control method including: sensing a characteristic of at least one LED, and acquiring, from the storage, at least one of first brightness and a first color coordinate of the at least one LED corresponding to the sensed characteristic; setting a target value by comparing at least one of second brightness and a second color coordinate received from at least one external display module with the at least one of the first brightness and the first color coordinate of the at least one LED; and adjusting the at least one of the first brightness and the first color coordinate of the at least one LED to have the target value.

The setting may include setting the target value based on the at least one of the second brightness and the second color coordinate in response to the second brightness being lower than the first brightness and/or the second color coordinate being lower than the first color coordinate.

The adjusting may include acquiring, from the storage, a correction coefficient, per pixel, to adjust the at least one of the first brightness and the first color coordinate, and adjusting the at least one of the first brightness and the first color coordinate of the at least one LED to have the target value, based on the acquired correction coefficient.

The adjusting may include obtaining a correction coefficient by comparing the at least one of the first brightness and the first color coordinate of the at least one LED with the target value, and adjusting the at least one of the first brightness and the first color coordinate of the pixel area to have the target value, based on the obtained correction coefficient.

The sensing may include sensing at least one of a temperature characteristic and a service life characteristic of the at least one LED by using at least one of a temperature sensor and an electrical current detecting sensor.

BRIEF DESCRIPTION OF THE DRAWINGS

The above and/or other aspects will become apparent and more readily appreciated from the following description of exemplary embodiments, taken in conjunction with the accompanying drawings, in which:

FIGS. 7A and 7B are diagrams illustrating a method of compensating brightness of a display apparatus according to another exemplary embodiment;

DETAILED DESCRIPTION

Figure 1:
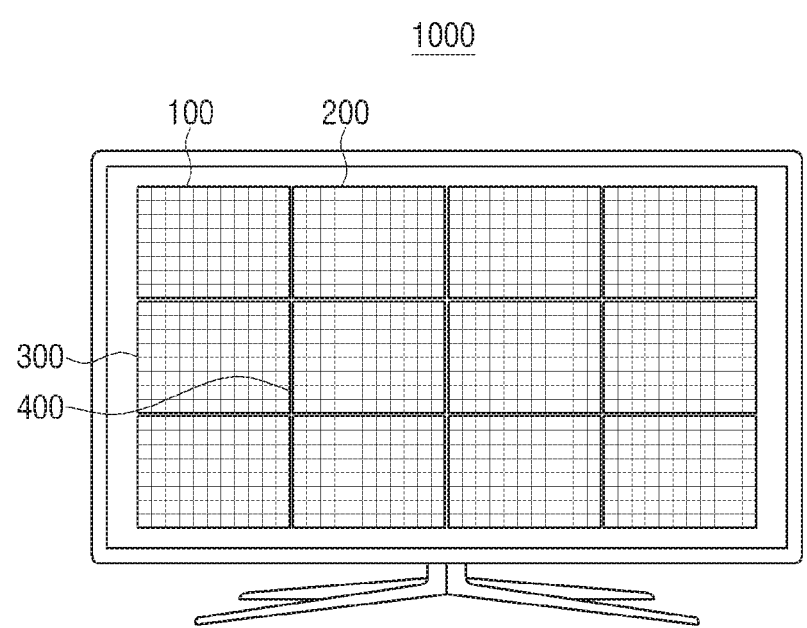
FIG. 1 is a diagram illustrating a configuration of a display apparatus according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the inventive concept. Accordingly, it is apparent that the exemplary embodiments of the inventive concept can be carried out without those specifically defined matters. Also, well-known functions or constructions are not described in detail because they may obscure the invention with unnecessary detail.

FIG. 1 is a diagram illustrating a configuration of a display apparatus according to an exemplary embodiment.

Referring to FIG. 1, the display apparatus 1000 according to an exemplary embodiment may be implemented in a form in which a plurality of module type display apparatuses (or display modules) 100, 200, 300, 400 . . . are connected to each other. Herein, each of a plurality of module type display apparatuses 100-400 may include a plurality of pixels which are arrayed in a matrix form. Specifically, the module type display apparatuses 100-400 may be implemented as a light emitting diode (LED) module in which a plurality of pixels are respectively implemented as LED pixels or LED cabinets in which a plurality of LED modules are connected to each other.

However, exemplary embodiments are not limited to the above. For example, in another exemplary embodiments, the display module may be implemented as a liquid crystal display (LCD), an organic LED (OLED), an active-matrix OLED (AMOLED), a plasma display panel (PDP), and the like. However, for the convenient explanation, the following embodiment will be described based on assumption that the module type display apparatuses 100-400 are implemented as an LED module or an LED cabinet.

According to an exemplary embodiment, each of a plurality of module type display apparatuses 100-400 may include a processor to control operation of each display module, and a driving module to drive each display module according to the controlling of the processor. In this case, processors and driving modules may each be implemented as hardware, software, firmware, an integrated chip (IC), and the like. According to an exemplary embodiment, each of the processors may be implemented as semiconductor ICs which are separate from each other.

According to another exemplary embodiment, there may be one single processor to control the display apparatus 100, and each of a plurality of display modules may include a driving module to drive each of the display modules according to the controlling of the processor. Herein, a plurality of driving modules corresponding to a plurality of display modules may be respectively implemented as a plurality of semiconductor ICs.

In each display module of the display apparatus 100, a difference of the brightness and the color may occur according to a history of use, i.e., according to a frequently used display section (e.g., display section corresponding to cinema contents having a different aspect ratio, a logo area, and the like).

To solve the above problem, an exemplary embodiment may automatically compensate (or adjust) the brightness and color coordinates based on a temperature characteristic and a service life characteristic of each display module, which will be explained in detail with reference to various exemplary embodiments.

Figure 2:
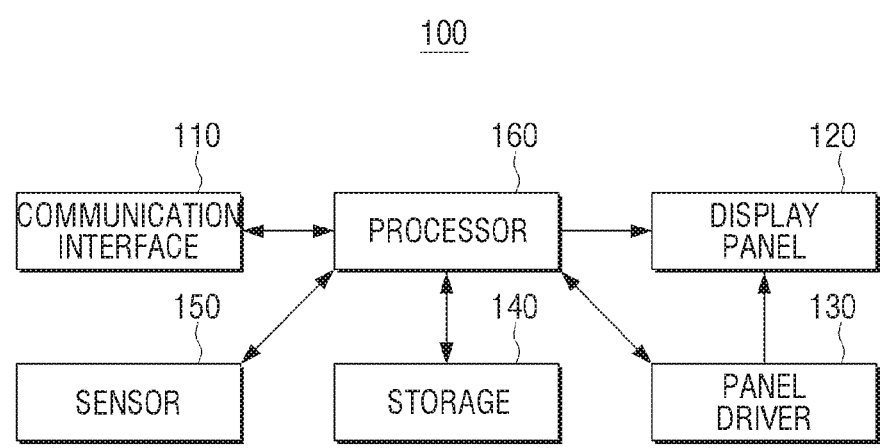
FIG. 2 is a block diagram illustrating a configuration of a module type display apparatus according to an exemplary embodiment.

FIG. 2 is a block diagram illustrating a configuration of a module type display apparatus according to an exemplary embodiment.

Referring to FIG. 2, the module type display apparatus 100 may include a communication interface 110, a display panel 120, a panel driver 130, a storage 140, at least one sensor 150 and a processor 160.

The communication interface 110 may perform communication with at least one external module type display apparatus. Herein, an external module type display apparatus may refer to another display module (e.g., display module 200, 300, or 400 of FIG. 1) that is included in the display apparatus 1000 (or display system) together with the module type display apparatus 100.

The communication interface 110 may be implemented as at least one of a high-definition multimedia interface (HDMI) port, a component input port, and a universal serial bus (USB) input port according to performance and a configuration of the module type display apparatus 100, or implemented to perform communication according to various communication protocols such as a wire Ethernet, a local area network (LAN) communication, and a wireless LAN communication.

The display panel 120 may be implemented as an LED module (e.g., including at least one LED device) or LED cabinet in which a plurality of LED modules are connected to each other. Further, an LED module may include a plurality of LED pixels, and according to an exemplary embodiment, LED pixels may be implemented as red, green, and blue (RGB) LEDs, and RGB LEDs may include a red LED, a green ED, and a blue LED.

The panel driver 130 may drive the display panel 120 according to the controlling of the processor 160. Specifically, to drive each of LED devices included in the display panel 120 according to the controlling of the processor 160, the panel driver 130 may apply driving voltage or driving current to the display panel 120, to drive each LED pixel.

The storage 140 may store various data used to operate the module type display apparatus 100.

The storage 140 may store information regarding a binning group, information regarding a maximum brightness per pixel, and information regarding a color per pixel. The 'binning group' as used herein may refer to an LED pixel group having the maximum identical characteristic (e.g., brightness or color coordinates) for an LED pixel.

Specifically, the storage 140 may previously measure at least one of the brightness and color coordinates according to a characteristic of the light emitting diode included in the display panel 120 and store the information thereof. In this case, the measurement environment information (e.g., brightness of a surrounding, a measuring distance, a type of a measuring device, and the like) may be also stored.

Further, the storage 140 may store a correction coefficient per pixel to compensate (or adjust) at least one of the brightness and color coordinates of the light emitting diode according to at least one of a temperature characteristic and a service life characteristic of the light emitting diode included in the display panel 120.

Specifically, the storage 140 may store a characteristic of LED pixels included in the display panel 120, e.g., information regarding at least one of the brightness and color coordinates per LED pixel according to at least one of a temperature characteristic and a service life characteristic of the LED pixel.

To this end, the storage 140 may acquire and store information in which a brightness value of the light generated per red, green, or blue sub-pixel of an LED pixel is previously measured according to at least one of a temperature characteristic and a service life characteristic of the LED pixel.

Further, the storage 140 may acquire and store information in which a color coordinate value of an LED pixel is previously measured according to at least one of a temperature characteristic and a service life characteristic of the LED pixel. Specifically, an optical characteristic of an LED device may be measured with a color coordinate value on Commission Internationale de l'Eclairage (CIE) color system by extracting red, green, or blue spectrum of an LED pixel and processing the extracted spectrum according to the CIE color system.

For example, a brightness value and a color coordinate value of an LED pixel which changes per temperature at a specific measurement environment may be previously measured, a brightness value and a color coordinate value of an LED pixel which changes per service life may be previously measured, and the measured values may be stored in the storage 140. For example, the measured values may be stored in a form of a look-up table. In this case, the look-up table may include a brightness value and a color coordinate value corresponding to a combination of temperature and service life. For example, a brightness value and a color coordinate value corresponding to temperature A and service life B may be stored.

Alternatively, the look-up table may include a brightness value corresponding to temperature, a brightness value corresponding to service life, a color coordinate value corresponding to temperature, or a color coordinate value corresponding to service life. The above examples are illustrative and the exemplary embodiments are not limited thereto.

Further, the storage 140 may store a correction coefficient to compensate (or adjust) a characteristic of an LED device included in the display panel 120, e.g., at least one of the brightness and color coordinates per pixel of each LED device according to at least one of a temperature characteristic and a service life characteristic. For example, a correction coefficient to be applied to the panel driver 130 to compensate a brightness value 'a' of an LED device to have a brightness value 'b' may be previously obtained and stored. For example, the correction coefficient may be a gain value applied to an electrical current value (or electrical voltage value) inputted to the corresponding LED device or a duty cycle applied to a gain value.

The at least one sensor 150 may sense a characteristic of a pixel area including at least one light emitting device. Herein, the pixel area may be an area including at least one LED device, which may indicate one pixel area including one LED device (or RGB LEDs) or a plurality of pixel areas including a plurality of LED devices. The at least one sensor 150 may be provided per LED pixel, or per pixel area including one or a plurality of LED pixels, or the at least one sensor 150 may be provided per the entire display panel 120. For example, when the display panel 120 is implemented as an LED cabinet including a plurality of LED modules, a temperature sensor and a service life sensor may be provided in each of a plurality of LED modules included in the display panel 120.

Further, a characteristic of the pixel area may include at least one of a temperature characteristic and a service life characteristic of the light emitting diode included in the pixel area. In this case, the at least one sensor 150 may be implemented as one or more temperature sensors and/or one or more service life sensors.

According to an exemplary embodiment, the service life sensor may be implemented as an electrical current detecting sensor that measures driving currents; however, exemplary embodiments are not limited to be above. Other types of a sensor may be used as long as a sensing value of the sensor may be used to predict the service life of an LED device. For example, when the electrical current detecting sensor is used, a use amount of the electrical currents during a clock counter may be accumulated, and the service life of at least one LED device included in the corresponding pixel area may be predicted based on the accumulated electrical current amount.

According to an exemplary embodiment, the at least one sensor 150 may sense the temperature and the service life corresponding to a pixel area at a preset time interval or may sense the temperature and the service life when a preset event such as, for example, electrical power on/off occurs.

The processor 160 may control the overall operation of the module type display apparatus 100.

For example, the processor 160 may set a target value based on at least one of the brightness and color coordinates received from at least one external module type display apparatus, and compensate (or adjust) at least one of the brightness and the color coordinates of a specific pixel area to have the target value based on the information acquired from the storage 140. Further, the processor 160 may control the panel driver 130 based on the compensated value.

For example, the processor 160 may acquire, from the storage 140, a brightness value of a corresponding pixel area according to at least one of the temperature characteristic and the service life characteristic sensed by the at least one sensor 150, compare the acquired brightness value with the brightness value received from the external module type display apparatus, and set a target value of brightness (or a target brightness value).

Also, the processor 160 may acquire, from the storage 140, a color coordinate value of the corresponding pixel area according to at least one of the temperature characteristic and the service life characteristic sensed by the at least one sensor 150, compare the acquired color coordinate value with the color coordinate value received from the external module type display apparatus, and set a target value of a color coordinate (or a target color coordinate value).

Further, a driving signal to compensate at least one of the brightness and color coordinates of a pixel area to have a target value may be outputted to the panel driver 150.

In this case, based on at least one of the temperature characteristic and the service life characteristic sensed by the at least one sensor 150, the processor 160 may compare the brightness value acquired from the storage 140 with the brightness value received from at least one external display module, and set, as a main module type display apparatus, an external module type display apparatus having a lowest performance value, e.g., a lowest brightness value, and set a target value based on the brightness value of the main module type display apparatus.

Further, based on at least one of the temperature characteristic and the service life characteristic sensed by the at least one sensor 150, the processor 160 may compare the color coordinate value acquired from the storage 140 with the color coordinate value received from at least one external display module, and set, as a main module type display apparatus, an external module type display apparatus having a lowest color representation, e.g., a lowest color coordinate value, and set a target value based on the color coordinate value of the main module type display apparatus.

However, the exemplary embodiments are not limited to the above examples. For example, depending on embodiments, the processor 160 may exclude the brightness value and/or the color coordinate value that is equal to, or less than a preset threshold value, and set a target value based on remaining (or non-excluded) brightness values and color coordinate values.

Further, instead of setting a target value based on a lowest value among the brightness values and the color coordinate values, the processor 160 may set the target value based on a value that meets a preset condition, e.g., a value corresponding to lower 10% of the brightness values and/or the color coordinate values.

It is described above that the processor 160 may set a target brightness value based on the brightness value at a current temperature of the display module having a lowest brightness value. However, the exemplary embodiments are not limited thereto, and according to an alternative embodiment, a target brightness value for the compensation may be set based on specific temperature (e.g., convergence temperature). For example, because a brightness value of an LED pixel may gradually converge at specific temperature, a target brightness value may be set based on the specific convergence temperature at which the brightness value of the LED pixel converges. However, exemplary embodiments are not limited to the above. Accordingly, a brightness value at any temperature (e.g., 25°) other than the convergence temperature may be also set to be a target brightness value. In this case, a brightness value (or color coordinates) of the main module type display apparatus may be also adjusted based on the target brightness value.

When a target value is set, the processor 160 may acquire a correction coefficient per pixel to compensate at least one of the brightness and color coordinates of the pixel area in the display panel 120 to have a target value from the storage 140, and compensate at least one of the brightness and color coordinates of the pixel area based on the acquired correction coefficient.

Further, when a target value is set, the processor 160 may compare at least one of the brightness and color coordinates of the pixel area with the target value to obtain a correction coefficient to compensate at least one of the brightness and color coordinates of the pixel area to have the target value, and compensate at least one of the brightness and color coordinates of the pixel area to have the target value based on the obtained correction coefficient.

In this case, to compensate at least one of the brightness and color coordinates of the pixel area to have a target value, the processor 160 may adjust a duty cycle of pulses (e.g., R_Pulse, G_Pulse, B_Pulse) inputted into at least one LED device corresponding to the pixel area. For the above, a duty cycle of the pulses (e.g., R_Pulse, G_Pulse, B_Pulse) may be adjusted according to a correction coefficient, and outputted to the panel driver 130 to drive the LED device. The panel driver 130 may provide driving currents to the display panel 120 corresponding to each driving signal (or control signal) outputted from the processor 160, to drive the display panel 120. Thus, the display panel 120 may adjust time or intensity of the driving currents provided to each LED device corresponding to each inputted driving signal and output a result.

Figure 3:
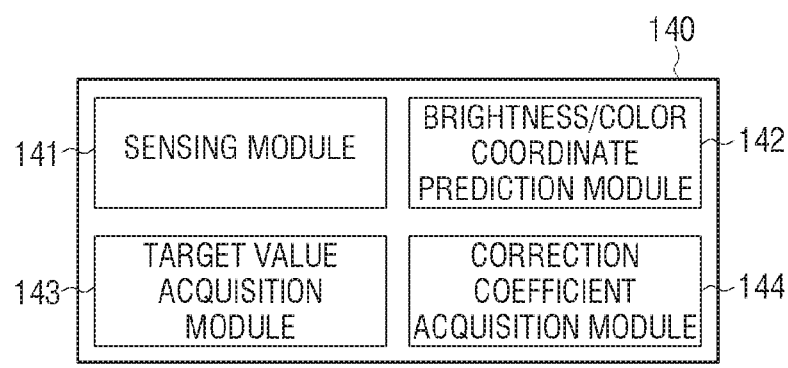
FIG. 3 is a diagram illustrating a storage according to an exemplary embodiment.

FIG. 3 is a diagram illustrating a storage according to an exemplary embodiment.

As illustrated in FIG. 3, the storage 140 may store a sensing module 141, a brightness and/or color coordinate prediction module 142, a target value acquisition module 143, and a correction coefficient acquisition module 144.

The sensing module 141 may include an algorithm to process a sensing value acquired through the sensor 150.

The processor 160 may determine temperature and/or an LED service life of a corresponding pixel area from the sensing value acquired through the sensor 150 by using a corresponding module (or by performing a corresponding algorithm).

The brightness and/or color coordinate prediction module 142 may include an algorithm to predict the brightness and/or color coordinates of a corresponding pixel area based on the acquired temperature and/or the LED service life of the corresponding pixel area that is acquired by using the sensing module 141.

Figure 4A:
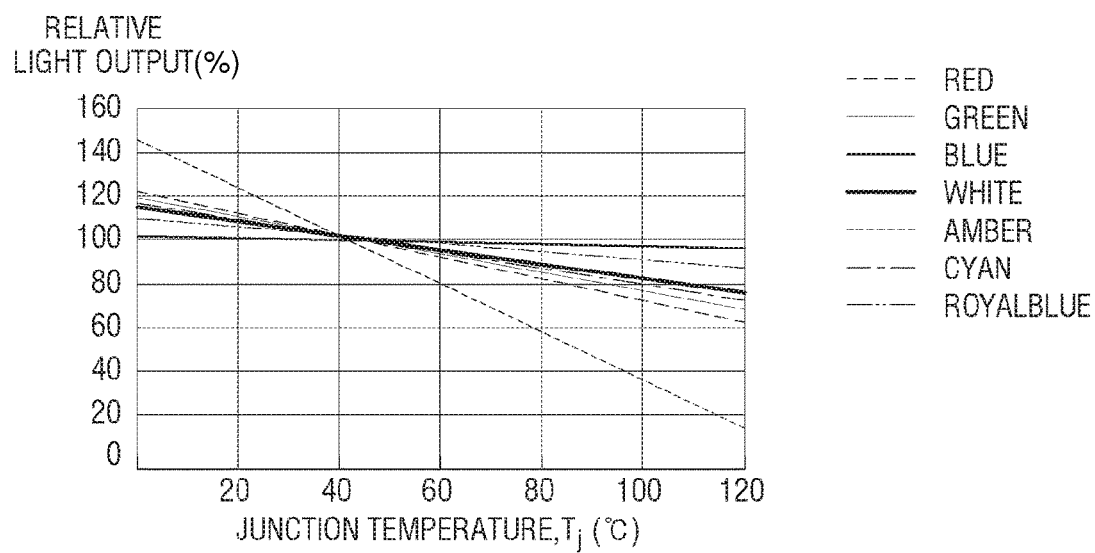
FIGS. 4A and 4B illustrate a change of brightness of a light emitting diode (LED) according to temperature and service life, respectively.
Figure 4B:
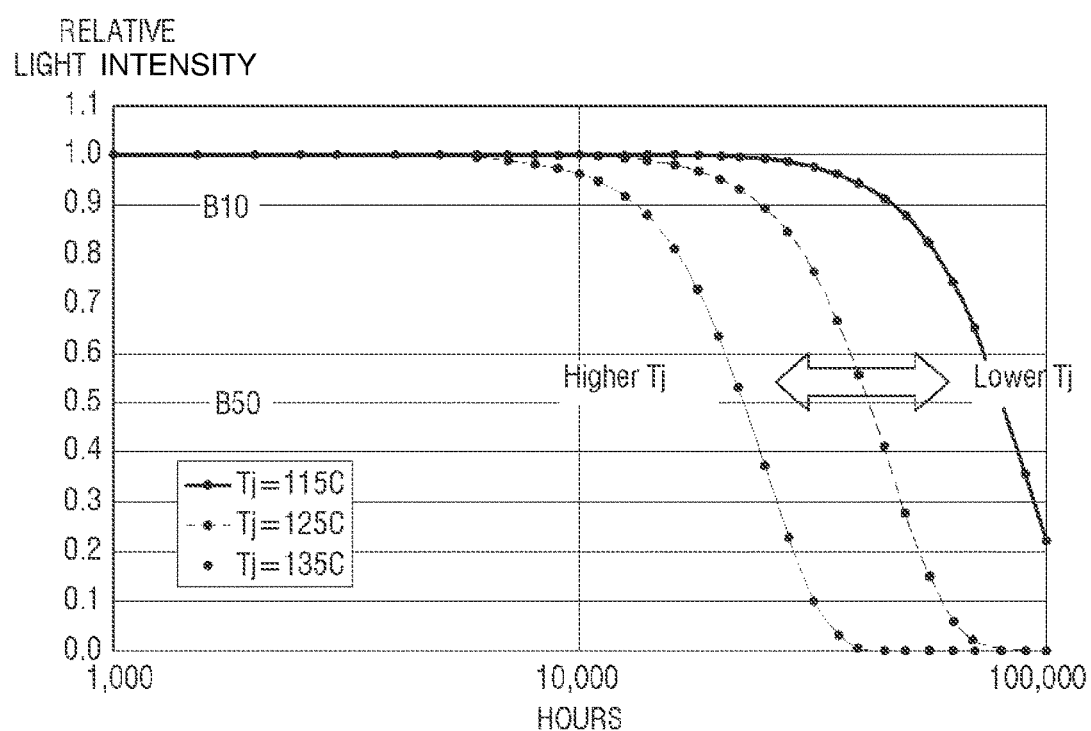

The processor 160 may predict the brightness and/or color coordinates of a corresponding pixel area from the previously stored brightness and/or color coordinate information per pixel according to temperature, the brightness and/or color coordinate information per pixel according to service life, and the color coordinate information by using a corresponding module (or by performing a corresponding algorithm). For example, as illustrated in FIGS. 4A and 4B, the brightness of an LED changes according to temperature and service life, respectively. Accordingly, after LED brightness according to temperature and service life are previously measured and corresponding information of the LED brightness is stored, the brightness and/or color coordinates of a corresponding pixel area may be predicted based on the sensed temperature and service life regarding the corresponding pixel area, by using the previously stored information. In an exemplary embodiment, temperature and service life may be sensed at a preset time interval or when a specific event such as on/off occurs.

The target value acquisition module 143 may include an algorithm to set a target brightness value and/or color coordinate value of a pixel area.

By using a corresponding module, the processor 160 may compare the brightness and/or color coordinate information predicted regarding corresponding pixel area with the brightness/color coordinates received from at least one external display module, and set a target value based on at least one of the brightness and color coordinates of a pixel area in the external module type display apparatus having a lowest performance value (e.g., a lowest brightness value).

The correction coefficient acquisition module 144 may include an algorithm to acquire a correction coefficient to compensate the brightness and/or color coordinates of a corresponding pixel area to have a target value. For example, the correction coefficient acquisition module 144 may include an algorithm to predict a degradation degree of a pixel according to an initial brightness value, a maximum brightness value, a current brightness value, an operation time and temperature, and an algorithm to obtain a correction coefficient based on the predicted degradation degree.

The processor 160 may compare at least one of the brightness and/or color coordinates of a pixel area with a target value, and obtain a correction coefficient to compensate the at least one of the brightness and/or color coordinates of a pixel area to have the target value. Further, the processor 160 may compare at least one of the brightness and color coordinates of a pixel area with the target value, and acquire a correction coefficient to compensate the at least one of the brightness and color coordinates of a pixel area to have the target value based on the previously stored correction coefficient.

Figure 5:
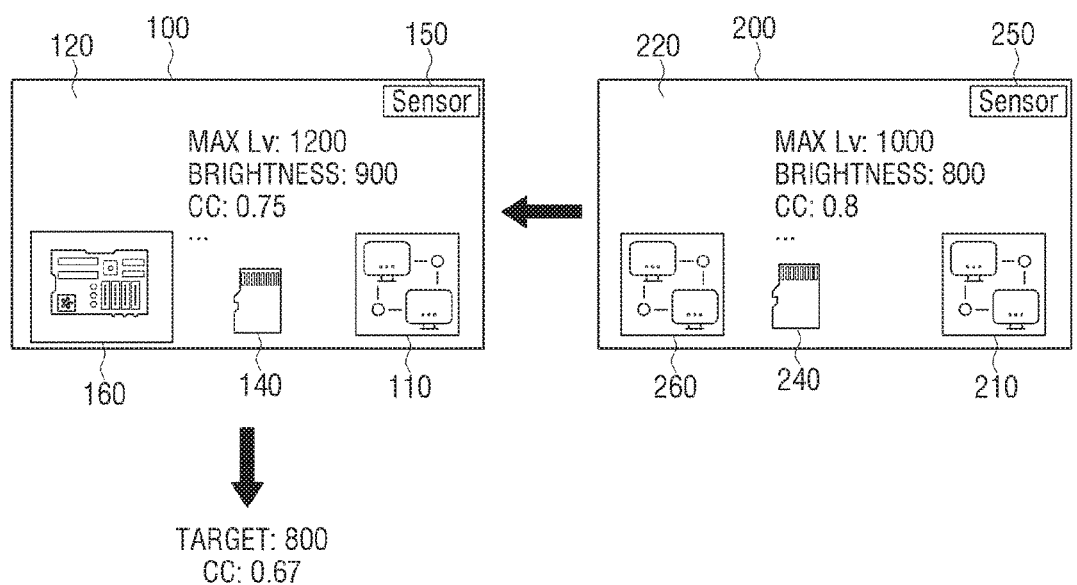
FIG. 5 is a diagram illustrating a method of compensating brightness of a module type display apparatus according to an exemplary embodiment.

FIG. 5 is a diagram illustrating a method of compensating the brightness of the module type display apparatus according to an exemplary embodiment.

As illustrated in FIG. 5, when the module type display apparatus 100 is adjacent to and/or connected with a second module type display apparatus 200, the module type display apparatus 100 and the second module type display apparatus 200 may determine a target brightness value by interchanging the brightness information therebetween. The second module type display apparatus 200 may include a communication interface 210, a display panel 220, a storage 240, a sensor 250, and a processor 260.

Specifically, the processor 160 included in the module type display apparatus 100 may compare a brightness value ("800 nit") of the second module type display apparatus 200 with its own brightness value ("900 nit") and determine the second module type display apparatus 200 having the lower brightness value to be the main module type display apparatus, and determine a corresponding brightness value ("800 nit") of the determined main module type display apparatus 200 to be the target brightness value. Herein, the module type display apparatus 100 may acquire its own brightness value from the storage 140 based on at least one of the temperature and service life characteristics measured by the sensor 150, as described above. Further, the second module type display apparatus 200 may predict its own current brightness value according to the same method (e.g., acquiring its own brightness value from the storage 240 based on at least one of the temperature and service life characteristics measured by the sensor 250), and provide the predicted value of the second module type display apparatus 200 to the module type display apparatus 100.

Next, the processor 160 may obtain a correction coefficient to reduce the brightness value ("900 nit") of the module type display apparatus 100 to have the target brightness value ("800 nit"). For example, according to an equation, "target brightness value ÷ maximum brightness value=correction coefficient," a correction coefficient (e.g., gain value) may be calculated as, $800/1200=0.67$. Thus, a correction coefficient may be updated from $900/1200=0.75$ into 0.67. Further, the updated correction coefficient may be stored in the storage 140, to update the stored correction coefficient.

However, although the above exemplary embodiments describe that a brightness value of the entire module type display apparatus 100 is adjusted, this is only an example for the convenient explanation, and the exemplary embodiments are not limited thereto. For example, a correction coefficient may be respectively obtained on a basis of a pixel area unit.

Figure 6:
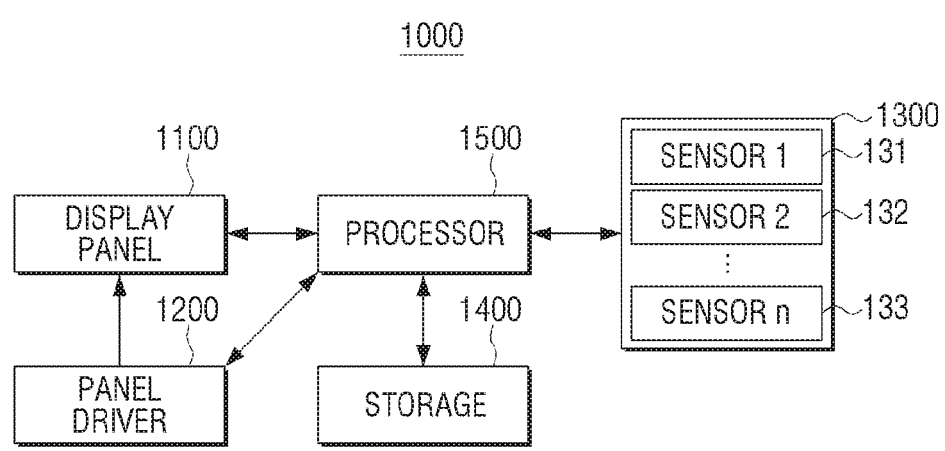
FIG. 6 is a block diagram illustrating a configuration of a display apparatus according to another exemplary embodiment.

FIG. 6 is a block diagram illustrating a configuration of the display apparatus according to another exemplary embodiment.

Referring to FIG. 6, the display apparatus 1000 includes the display panel 1100, the panel driver 1200, the sensor 1300, the storage 1400 and the processor 1500.

The display panel 1100 may include a plurality of display modules, i.e., a plurality of module type display apparatuses 100 (or a plurality of display modules) described above. A plurality of display modules may be connected to each other by using various methods, and included in one display 110. Herein, the display module may be implemented as an LED module (e.g., including at least one LED device) or an LED cabinet in which a plurality of LED modules are connected to each other.

The panel driver 1200 may include a plurality of driving modules corresponding to a plurality of display modules, respectively. Each of a plurality of driving modules may drive a corresponding display panel according to the controlling of the processor 1500.

A plurality of sensors 1300 may respectively sense characteristics of a plurality of display modules. Herein, the characteristics of the plurality of display modules may include at least one of a temperature characteristic and a service life characteristic of a pixel area formed with at least one light emitting diode included in the display modules. A plurality of sensors 1300 may be provided per display module, or per LED device, or per area including a plurality of LED devices.

The storage 1400 may store information regarding a binning group of an LED device included in each of a plurality of display modules, information regarding a maximum brightness per pixel, and information regarding a color per pixel. Herein, a binning group may be an LED group having a maximum identical characteristic (e.g., brightness, color coordinates) regarding an LED.

The storage 1400 may previously measure at least one of the brightness and color coordinates according to a characteristic of the light emitting diode per display module included in the display panel 1100 (e.g., a temperature characteristic and/or a service life characteristic), and store the information thereof. In this case, the measurement environment information (e.g., brightness of a surrounding, a measuring distance, and a type of a measuring device) may be stored.

The storage 1400 may store a characteristic of an LED device included in each display module included in the display panel 1100, e.g., information regarding each LED device according to at least one of the temperature characteristic and the service life characteristic, i.e., regarding at least one of the brightness and color coordinates per pixel.

Further, the storage 1400 may store a correction coefficient per pixel to be used to compensate at least one of the brightness and color coordinates of the light emitting diode according to at least one of a temperature characteristic and a service life characteristic of the light emitting diode included in each display module included in the display panel 1100.

The processor 1500 may control general operation of the display apparatus 1000.

The processor 1500 may acquire, from the storage 1400, information (e.g., a correction coefficient) to be used to compensate at least one of the brightness and color coordinates of an LED in a corresponding display module according to a sensing value sensed by a plurality of sensors 1300, generate a signal to compensate at least one of the brightness and color coordinates of corresponding module based on the acquired information, and output the generated signal to the panel driver 1200.

Specifically, the processor 1500 may predict at least one of the brightness and color coordinates of a corresponding display module based on at least one of the temperature and the service life characteristic sensed by a plurality of sensors 1300, and compensate at least one of the brightness and color coordinates of the display module based on at least one of a target brightness and a target color coordinates.

The processor 1500 may set a main display module, among a plurality of display modules, based on at least one of the brightness and color coordinates of the plurality of display modules, set at least one of the brightness and color coordinates corresponding to the main display module as a target value, and compensate at least one of the brightness and color coordinates of other display modules to have the target value based on the information acquired from the storage 1400.

In this case, the processor 1500 may compare at least one of the brightness and color coordinates per display module which are acquired from the storage 1400, and set at least one of the brightness and color coordinates of the display module having a lowest performance value (e.g., a lowest brightness value) as a target value. However, this is merely an example and a target value may be set by using various methods according to embodiments.

When a target value is set, the processor 1500 may acquire a correction coefficient per pixel from the storage 1400 to compensate at least one of the brightness and color coordinates of the other display modules excluding the main display module to have the target value, and compensate at least one of the brightness and color coordinates of a pixel area of the other display modules excluding the main display module based on the acquired correction coefficient.

Further, when a target value is set, the processor 1500 may compare at least one of the brightness and color coordinates of the other display modules with a target value and obtain a correction coefficient to compensate at least one of the brightness and color coordinates of a pixel area to have the target value, and compensate at least one of the brightness and color coordinates of the other display modules to have target value based on the obtained correction coefficient.

For example, as illustrated in FIG. 7A, when maximum brightness values of four display modules 100, 200, 300, 400 are respectively 1200 nit, 1200 nit, 1000 nit, and 1000 nit, and the brightness values predicted according to the current temperature and service life characteristics are respectively 900 nit, 800 nit, 700 nit, 800 nit, gains of 0.75, 0.67, 0.7, 0.8 may be applied.

According to an exemplary embodiment, 700 nit which is the lowest among the four brightness values may be set as a target brightness value for the display modules 100, 200, and 400.

In this case, as illustrated in FIG. 7B, a correction coefficient (e.g., a corrected gain value) to adjust the brightness values of the display modules 100, 200, and 400 to have the target brightness value, 700 nit, may be obtained. For example, a correction coefficient corresponding to the display modules 100, 200, and 400 may be respectively 0.58, 0.58, and 0.7. In this case, a correction coefficient for the brightness value compensation may be stored in the storage 1400, as described above. However, according to embodiments, a correction coefficient may be obtained at real time by comparing the predicted brightness value regarding the current LED module with a target brightness value.

Figure 8:
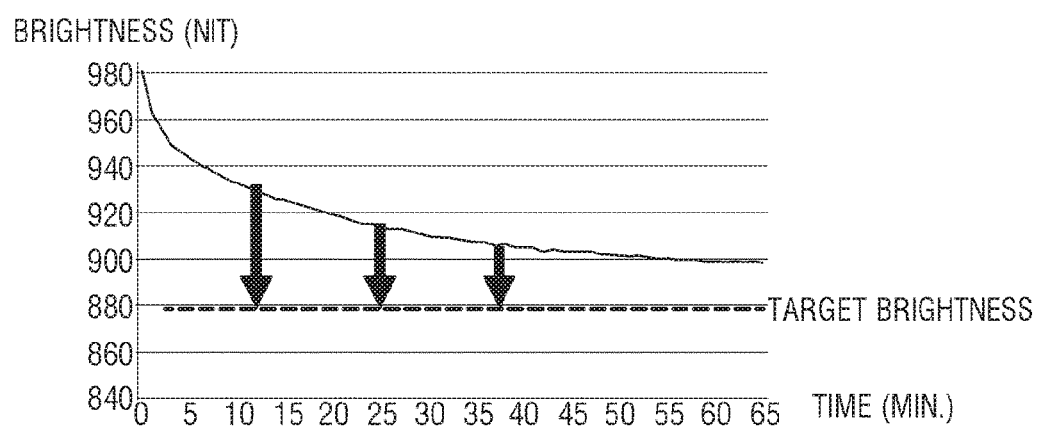
FIG. 8 is a graph illustrating a case in which a brightness value of each display module is adjusted to be a target brightness value according to an exemplary embodiment.

FIG. 8 is a graph illustrating an example in which a brightness value of each display module is adjusted to be a target brightness value according to an exemplary embodiment.

A brightness value of an LED device may converge at specific temperature (or convergence temperature), and a target brightness value for the compensation may be set based on the convergence temperature. However, exemplary embodiments are not limited to the above; a brightness value at any given temperature (e.g., 25°) may be set as a target brightness value.

Figure 9:
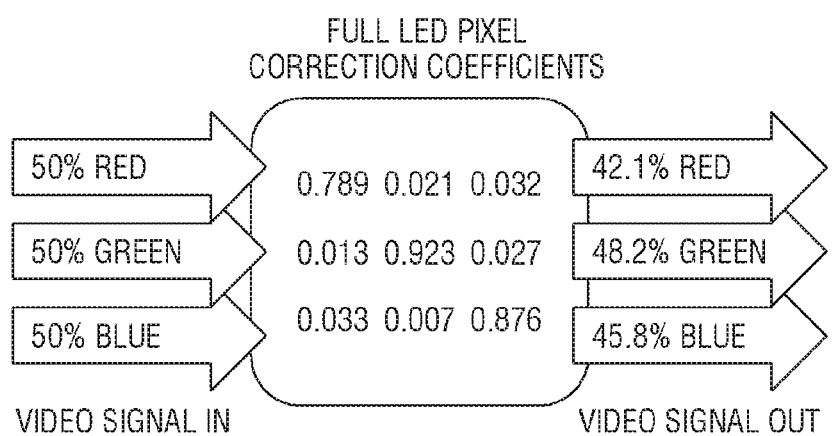
FIG. 9 is a diagram illustrating an example in which color coordinates are compensated according to an exemplary embodiment.

FIG. 9 is a diagram illustrating an example in which the color coordinates is compensated according to an exemplary embodiment.

When the color coordinates of an LED pixel is adjusted as illustrated in FIG. 9, the color coordinates may be compensated by respectively adjusting R, G, and B components regarding R, G, and B sub-pixels included in LED pixels. Similarly to the case of adjusting brightness, the color coordinates adjustment may be performed by setting a target color coordinate value based on the color coordinates that are predicted based on at least one of the temperature characteristic and the service life characteristic and adjusting the color coordinates to achieve the target color coordinate value. Herein, a target color coordinate value may be determined based on a lowest color coordinate value among the compared color coordinate values of a plurality of display modules; however, exemplary embodiments are not limited to the above. According to embodiments, a middle color coordinate value may be set as a target color coordinate value. For example, when a specific pixel has a particularly low color coordinate value, a corresponding pixel may be excluded from the compensation process, and a target pixel may be selected from other pixels excluding the corresponding pixel.

Figure 10:
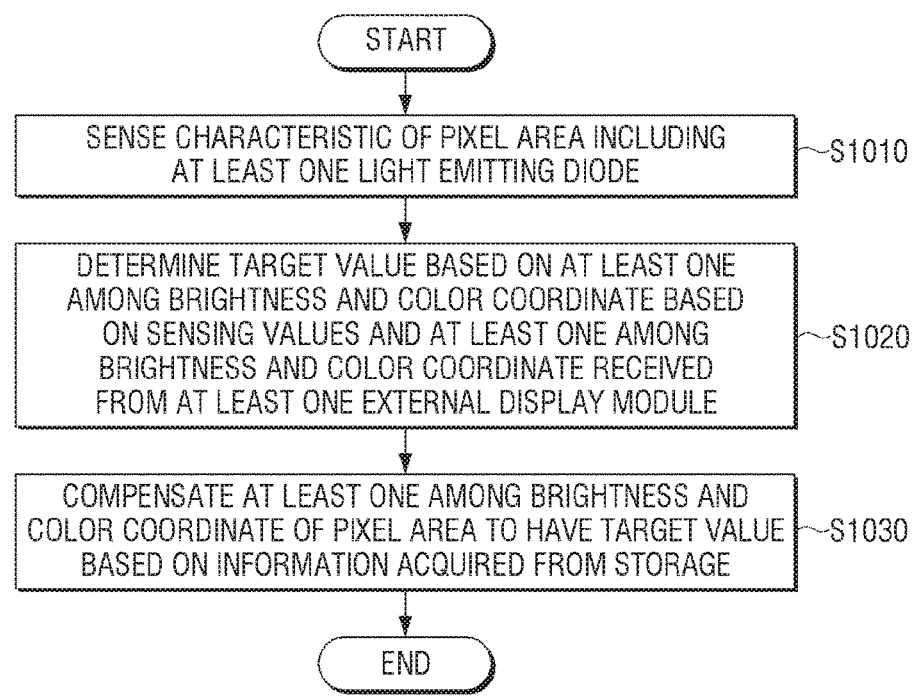
FIG. 10 is a flowchart illustrating a control method of a module type display apparatus according to an exemplary embodiment.

FIG. 10 is a flowchart illustrating a control method of the module type display apparatus according to an exemplary embodiment.

FIG. 10 illustrates the control method of the module type display apparatus including the storage configured to store information regarding at least one of the brightness and color coordinates according to a characteristic of a plurality of light emitting diodes included in the display panel according to an exemplary embodiment.

According to the control method of the module type display apparatus illustrated in FIG. 10, a characteristic of a pixel area including at least one light emitting diode may be sensed, and at least one of the brightness and color coordinates of the pixel area corresponding to the sensed characteristic may be acquired from the storage at S1010. Herein, the sensed characteristic of the pixel area may include at least one of the temperature characteristic and the service life characteristic sensed by at least one of the temperature sensor and the electrical currents detecting sensor.

At S1020, a target value may be determined by comparing at least one of the brightness and color coordinates received from at least one external display module with at least one of the brightness and color coordinates of the pixel area acquired from the storage.

Next, at least one of the brightness and color coordinates of the pixel area may be compensated to have a target value.

In the operation of determining the target value at S1020, at least one of the acquired brightness and color coordinates may be compared with at least one of the brightness and color coordinates received from at least one external display module, and at least one of the brightness and color coordinates of the pixel area of the display module having a lowest performance value (e.g., lowest brightness value) may be set to have the target value.

Further, in the operation of compensating at least one of the brightness and color coordinates to have the target value at S1030, a correction coefficient per pixel to be used to compensate at least one of the brightness and color coordinates of the pixel area to have the target value may be acquired from the storage, and at least one of the brightness and color coordinates of the pixel area may be compensated based on the acquired correction coefficient.

Further, in the operation of compensating the at least one of the brightness and color coordinates to have target value at S1030, at least one of the brightness and color coordinates of the pixel area may be compared with the target value such that a correction coefficient to be used to compensate the at least one of the brightness and color coordinates of the pixel area to have the target value is obtained, and at least one of the brightness and color coordinates of the pixel area may be compensated to have the target value based on the obtained correction coefficient.

As described above, according to the various exemplary embodiments, the automatic compensation (or adjustment) of at least one of brightness and a color coordinate can be performed by predicting at least one of the brightness and color coordinate of each pixel area based on the temperature and service life characteristics of an LED device without a need to measure the actual brightness of the display panel.

Further, according to various exemplary embodiments, a display apparatus including a plurality of display modules may adjust brightness and/or color coordinates between the plurality of display modules automatically and uniformly based on previously stored information.

The methods according to various exemplary embodiments may be implemented by only upgrading software and/or hardware regarding the display apparatus including a related module type display apparatus and a plurality of module type display apparatuses.

The apparatuses according to exemplary embodiments may comprise a memory to store program data, a processor to execute the program data, a permanent storage unit such as a disk drive, a communication port to handle communications with external devices, and user interface devices, including a touch panel, keys, buttons, etc. When software modules or algorithms are involved, the software modules or algorithms may be stored as program instructions and/or computer readable codes executable on a processor, in a non-transitory computer readable recording medium. The computer readable recording medium indicates a medium which stores data semi-permanently and can be read by devices, rather than a medium that stores data temporarily such as register, a cache, or memory. Examples of the computer readable recording medium include magnetic storage media (e.g., read-only memories (ROMs), random-access memories (RAMs), floppy disks, hard disks, etc.), and optical recording media (e.g., compact disk (CD)-ROMs, or digital versatile disks (DVDs)). The computer readable recording medium can also be distributed over network coupled computer systems so that the computer readable code is stored and executed in a distributive manner. The computer readable code may be read by the computer, stored in the memory, and executed by the processor.

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in example embodiments without departing from the principles and spirit of the disclosure, the scope of which is defined in the claims and their equivalents.

What is claimed is:

1. A module type display apparatus, comprising:
   a communication interface;
   a display panel comprising a plurality of light emitting diodes (LEDs);
   a storage storing information regarding at least one of brightness or a color coordinate according to at least one of a temperature characteristic or a service life characteristic of the plurality of light emitting diodes;
   a sensor; and
   a processor configured to:
      based on identifying that at least one external module type display apparatus is adjacent to the module type display apparatus, receive information from the at least one external module type display apparatus through the communication interface;
      obtain at least one of a first brightness or a first color coordinate based on the information stored in the storage according to a characteristic of at least one LED sensed by the sensor; and
      identify a target value by comparing at least one of the first brightness or the first color coordinate with at least one of second brightness or a second color coordinate included in the received information, and adjust at least one of the first brightness or the first color coordinate to the target value.

2. The module type display apparatus of claim 1, wherein the processor is further configured to acquire, from the storage, the at least one of the first brightness or the first color coordinate of the at least one LED based on the characteristic, configured to compare the at least one of the first brightness or the first color coordinate with the at least one of the second brightness or the second color coordinate received from the at least one external module type display apparatus, and configured to set the target value based on the at least one of the second brightness or the second color coordinate based on the second brightness being lower than the first brightness and/or the second color coordinate being lower than the first color coordinate.

3. The module type display apparatus of claim 1, wherein the storage is further configured to store information regarding a correction coefficient, per pixel, to be used to adjust the at least one of the first brightness or the first color coordinate according to the at least one of the temperature characteristic or the service life characteristic of the at least one LED, and wherein the processor is further configured to acquire, from the storage, the correction coefficient, per pixel, and configured to adjust the at least one of the first brightness or the first color coordinate of the at least one LED to the target value, based on the acquired correction coefficient.

4. The module type display apparatus of claim 1, wherein the processor is further configured to obtain a correction coefficient by comparing the at least one of the first brightness or the first color coordinate of the at least one LED with the target value, and configured to adjust the at least one of the first brightness or the first color coordinate of the at least one LED to the target value, based on the obtained correction coefficient.

5. The module type display apparatus of claim 1, wherein the sensor comprises at least one of a temperature sensor or an electrical current detecting sensor, and
  the processor is further configured to acquire, from the storage, the at least one of the first brightness or the first color coordinate of the at least one LED corresponding to at least one of the temperature characteristic or the service life characteristic sensed by the at least one of the temperature sensor or the electrical current detecting sensor.

6. The module type display apparatus of claim 1, wherein the module type display apparatus comprises at least one of an LED module, the LED module comprising at least one LED device, and an LED cabinet in which a plurality of LED modules are connected to each other.

7. A display apparatus, comprising:
  a display comprising a plurality of display modules;
  a storage storing information regarding at least one of brightness or a color coordinate according to at least one of a temperature characteristic or a service life characteristic of a light emitting diode (LED) included in a display module among the plurality of display modules;
  a sensor; and
  a processor configured to:
    based on identifying a certain display module among the plurality of display modules, obtain at least one of a first brightness or a first color coordinate; based on the information stored in the storage according to a characteristic of the LED included in the certain display module sensed by the sensor;
    based on identifying that at least one display module is adjacent to the certain display module, obtain at least one of second brightness or a second color coordinate corresponding to the at least one display module based on the information;
    identify a target value by comparing at least one of the first brightness or the first color coordinate with at least one of the second brightness or the second color coordinate of the at least one display module; and
    adjust at least one of the first brightness or the first color coordinate to the target value.

8. The display apparatus of claim 7, wherein the processor is further configured to acquire, from the storage, the at least one of the second brightness or the second color coordinate of the at least one display module based on the characteristic, and configured to set the target value based on the at least one of the first brightness or the first color coordinate corresponding to the certain display module, based on the first brightness being lower than the second brightness and/or the first color coordinate being lower than the second color coordinate.

9. The display apparatus of claim 7, wherein the processor is further configured to exclude a display module of which the at least one of the first brightness or the first color coordinate is equal to or less than a preset threshold value, and identify the certain display module among remaining display modules of the plurality of display modules.

10. The display apparatus of claim 7, wherein the storage is further configured to store information regarding a correction coefficient, per pixel, to be used to adjust the at least one of the second brightness or the second color coordinate according to the at least one of the temperature characteristic or the service life characteristic of the LED, and
  the processor is further configured to acquire, from the storage, the correction coefficient, per pixel, and configured to adjust the at least one of the second brightness or the second color coordinate of the at least one display module, excluding the certain display module, to the target value, based on the acquired correction coefficient.

11. The display apparatus of claim 7, wherein the processor is further configured to obtain a correction coefficient by comparing the at least one of the first brightness or the first color coordinate of the certain display module with the at least one of the second brightness or the second color coordinate of the at least one display module, excluding the certain display module, and configured to adjust the at least one of the second brightness or the second color coordinate to the target value, based on the correction coefficient.

12. The display apparatus of claim 7, wherein the sensor comprises at least one of a temperature sensor or an electrical current detecting sensor, and
  the processor is further configured to acquire, from the storage, the at least one of the second brightness or the second color coordinate of the at least one display module, excluding the certain display module, corresponding to at least one of the temperature characteristic or the service life characteristic sensed by the at least one of the temperature sensor or the electrical current detecting sensor.

13. The display apparatus of claim 7, wherein one of the plurality of display modules comprises an LED module, comprising at least one LED device, and an LED cabinet in which a plurality of LED modules are connected to each other.

14. A control method of a module type display apparatus, the module type display apparatus comprising a storage storing information regarding at least one of brightness or a color coordinate according to at least one of a temperature characteristic or a service life characteristic of a light emitting diode (LED) included in a display panel, the control method comprising:
  based on identifying that at least one external module type display apparatus is adjacent to the module type display apparatus, receiving information from the at least one external module type display apparatus;
  obtaining at least one of a first brightness or a first color coordinate based on the information stored in the storage according to a characteristic of at least one LED sensed by a sensor;
  identifying a target value by comparing at least one of the first brightness or the first color coordinate with at least one of second brightness or a second color coordinate included in the received information; and
  adjusting the at least one of the first brightness or the first color coordinate of the at least one LED to the target value.

15. The control method of claim 14, wherein the identifying comprises setting the target value based on the at least one of the second brightness or the second color coordinate based on the second brightness being lower than the first brightness and/or the second color coordinate being lower than the first color coordinate.

16. The control method of claim 14, wherein the adjusting comprises acquiring, from the storage, a correction coefficient, per pixel, to adjust the at least one of the first brightness or the first color coordinate, and adjusting the at least one of the first brightness or the first color coordinate of the at least one LED to the target value, based on the acquired correction coefficient.

17. The control method of claim 14, wherein the adjusting comprises obtaining a correction coefficient by comparing the at least one of the first brightness or the first color coordinate of the at least one LED with the target value, and adjusting the at least one of the first brightness or the first color coordinate of a pixel area to the target value, based on the obtained correction coefficient.

18. The control method of claim 14, wherein the sensing comprises sensing at least one of the temperature characteristic or the service life characteristic of the at least one LED by using at least one of a temperature sensor or an electrical current detecting sensor.

* * * * *